United States Patent
Katefidis

(10) Patent No.: US 9,327,304 B2
(45) Date of Patent: May 3, 2016

(54) INSTALLATION FOR DIP COATING ARTICLES

(71) Applicant: Eisenmann SE, Böblingen (DE)

(72) Inventor: Apostolos Katefidis, Gärtringen (DE)

(73) Assignee: EISENMANN SE, Boeblingen (DE)

( * ) Notice: Subject to any disclaimer, the term of this patent is extended or adjusted under 35 U.S.C. 154(b) by 0 days.

(21) Appl. No.: 14/388,331

(22) PCT Filed: Mar. 9, 2013

(86) PCT No.: PCT/EP2013/000704
§ 371 (c)(1),
(2) Date: Sep. 26, 2014

(87) PCT Pub. No.: WO2013/143654
PCT Pub. Date: Oct. 3, 2013

(65) Prior Publication Data
US 2015/0068453 A1    Mar. 12, 2015

(30) Foreign Application Priority Data
Mar. 31, 2012 (DE) .................. 10 2012 006 630

(51) Int. Cl.
B05C 3/00      (2006.01)
B05C 3/10      (2006.01)
B05C 13/02    (2006.01)
B65G 49/04   (2006.01)

(52) U.S. Cl.
CPC . B05C 3/10 (2013.01); B05C 13/02 (2013.01); B65G 49/0459 (2013.01)

(58) Field of Classification Search
USPC .................. 118/423, 429; 427/425, 346, 435; 198/377.02, 377.03
See application file for complete search history.

(56) References Cited

U.S. PATENT DOCUMENTS

| | | | |
|---|---|---|---|
| 5,651,822 A | 7/1997 | Heckmann | |
| 5,725,669 A | 3/1998 | Heckmann | |
| 6,419,983 B1 | 7/2002 | Kreuzer | |
| 7,026,015 B2* | 4/2006 | Kreuzer | 427/425 |
| 2002/0162504 A1* | 11/2002 | Kreuzer | 118/416 |
| 2012/0097099 A1* | 4/2012 | Roeckle | 118/423 |

FOREIGN PATENT DOCUMENTS

| | | |
|---|---|---|
| DE | 43 04 145 C1 | 4/1994 |
| DE | 297 24 558 U1 | 1/2002 |

(Continued)

*Primary Examiner* — Yewebdar Tadesse
(74) *Attorney, Agent, or Firm* — Factor Intellectual Property Law Group, Ltd.

(57) ABSTRACT

An installation for dip coating articles, which are movable up to and away from at least one dip tank with the aid of a transport system. In order to be dipped and removed, they are moved onto a rotary platform of at least one stationary rotary station and are dipped into and removed from the treatment liquid by rotation of the rotary platform. Each article is fastened with the aid of a fastening device to a skid which interacts with the transport system. The fastening device has a holding structure for the article and at least two rockers which are U- or V-shaped and are fastened in a pivotable manner to the holding structure at their vertex. The two arms of the U or V have a slot into which one guide pin fastened to the skid engages and slides in the corresponding slot upon rotation of the skid.

2 Claims, 4 Drawing Sheets

(56) References Cited

FOREIGN PATENT DOCUMENTS

| | | |
|---|---|---|
| DE | 100 57 150 A1 | 5/2002 |
| DE | 103 33 146 A1 | 2/2005 |
| DE | 10 2008 026 317 A1 | 12/2009 |
| EP | 0 749 395 B1 | 3/1995 |

* cited by examiner

INSTALLATION FOR DIP COATING ARTICLES

RELATED APPLICATIONS

This application is a national phase of International Patent Application No. PCT/EP2013/000704, filed Mar. 9, 2013, which claims the filing benefit of German Patent Application No. 10 2012 006 630.9, filed Mar. 31, 2012, the contents of both of which are incorporated herein by reference.

FIELD OF THE INVENTION

The invention relates to an installation for immersion treating objects, in particular vehicle bodies, having
a) at least one immersion tank, which can be filled to a certain level with a treatment fluid;
b) a transport system, which moves the objects towards the immersion tank and away from this;
c) at least one stationary rotary station, which is provided on the immersion tank and has a rotary platform on which at least one object can be fastened in each case and which can be rotated from a first position, in which the object is located above the level of the treatment fluid, into a second position, in which the object is located below the level of the treatment fluid, and/or in the opposite direction between these two positions;
wherein
d) each object can be fastened to a skid, which cooperates with the transport system and can be fixed on the rotary platform of the rotary station, wherein the skid has a base structure and a fastening device for the object.

BACKGROUND OF THE INVENTION

A "stationary" rotary station here refers to one which is associated with an immersion tank and does not move through the entire installation together with the object to be treated. However, in individual cases, it can be moved back and forth over a certain stretch along an immersion tank.

Installations of the type mentioned above are described for example in DE 43 04 145 C1 or EP 0 749 395 B1. In these, the skids used have a substantially intrinsically rigid structure, wherein the vehicle body placed thereon cannot move with respect to the base structure. The platforms of the rotary stations on which the skids with the vehicle bodies are placed are connected via relatively long connecting rods to the axis of rotation of the respective rotary station. This is necessary to actually bring the vehicle bodies below the level of the treatment fluid in the immersion tank upon a rotation through 180° since the axis of rotation itself should be located outside the treatment is fluid. This results in the vehicle body being at a relatively high level within the rotary station, which is reflected by a correspondingly high level of the advancing and retreating transport systems. A height of this type is however undesirable, particularly in parts of the installation which are connected up and downstream and through which the vehicle bodies are to be guided on the same skids.

SUMMARY OF THE INVENTION

An object of the present invention is to design an installation of the type mentioned at the outset in such a way that the vertical position of the non-immersed objects on the rotary station is as low as possible.

This object may be achieved according to the invention in that
e) the fastening device has a holding structure for the object and at least two rockers, which are in the shape of a U or a V and are fastened in pivotable manner to the holding structure at their vertex;
wherein
f) both limbs of the U or V have a slot in which a guide pin which is fastened to the skid engages in each case and slides in the corresponding slot upon a rotation of the skid.

Therefore, according to the invention, the concept of a conventional skid, in which the vehicle body is fastened completely rigidly and immovably on the base structure of the skid, is abandoned. Instead, the object is given the freedom to move in a wholly defined manner with respect to the base structure of the skid under the influence of gravity, possibly also under the influence of an active drive, during the rotary movement in the rotary station. Gravity or the drive device ensures that, in the non-immersed position, in which it is located above the axis of rotation, the object moves as close as possible to the base structure of the skid. However, upon the rotation of the rotary platform, the degree of freedom granted to the fastening device becomes more significant and enables gravity to draw the object away from the base structure. Following a rotation through 180°, after which the object is lying "on its back" so to speak, this is then at the maximum spacing from the base structure and therefore also from the axis of rotation.

This may be achieved by the inventive design of the rockers connecting the holding structure to the skid. In the "normal position" of the object, in which this is therefore not immersed, the U or V of the rockers opens downwards, whereby the plane of symmetry extending through the vertex of the rockers is tilted with respect to the vertical. This results in a stable rest position of the object since, on the one hand, a further pivotal movement of the rockers in the direction in which gravity is acting is prevented by the stop formed between a guide pin and a slot and, on the other, the movement in the opposite direction is only possible under force since, for this purpose, the holding structure with the vehicle body mounted thereon has to be raised.

In order to maintain a low height of the fastening structure in the non-immersed position above the skid,
the rockers should be capable of pivoting as far as possible so that their vertices are close to the skid.

In the immersed position, the openings of the U or V of the rockers point upwards. The plane of symmetry passing through the vertices and therefore the coupling points of the rockers are substantially perpendicular. Both guide pins abut against the end of the corresponding slots of the rockers so that the holding structure with the object is suspended at two points by each rocker. This realises a very stable position of the object in the immersed position.

In a particularly preferred embodiment of the invention, the fastening device has a damping device which brakes the gravity-induced movement of the object with respect to the base structure of the skid. This enables the speed at which the object moves with respect to the base structure under the influence of gravity to be restricted as desired.

It is to be understood that the aspects and objects of the present invention described above may be combinable and that other advantages and aspects of the present invention will become apparent upon reading the following description of the drawings and detailed description of the invention.

BRIEF DESCRIPTION OF THE DRAWINGS

An exemplary embodiment of the invention is explained in more detail below with reference to the drawing, which shows.

DETAILED DESCRIPTION OF THE PRESENT INVENTION

Figure 1:
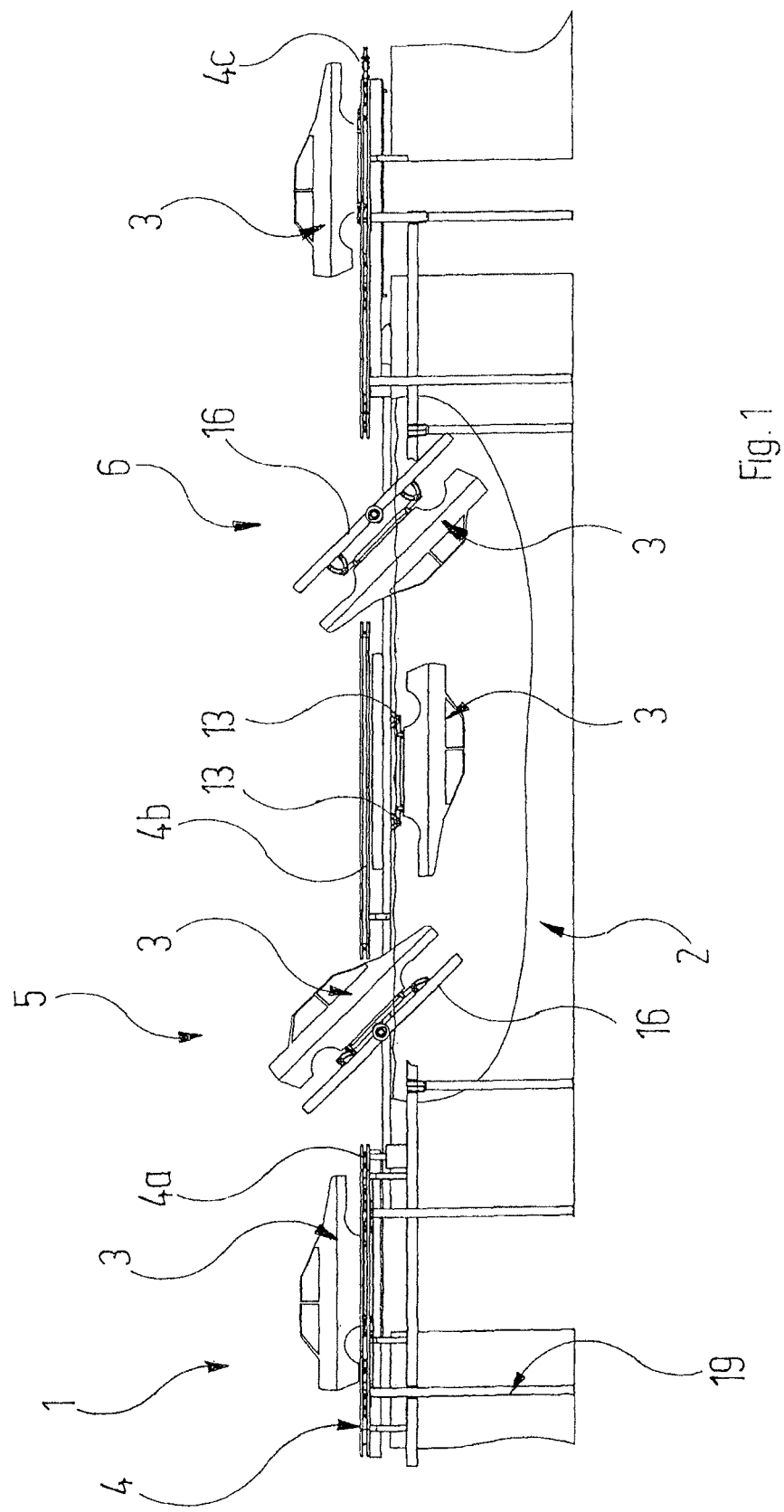
FIG. 1 a side view of a detail of an installation for the cataphoretic immersion painting of vehicle bodies.

While this invention is susceptible of embodiment in many different forms, there is shown in the drawings and will herein be described in detail one or more embodiments with the understanding that the present disclosure is to be considered as an exemplification of the principles of the invention and is not intended to limit the invention to the embodiments illustrated.

The installation for the cataphoretic immersion painting of vehicle bodies, which is shown as a detail in FIG. 1 and denoted as a whole by the reference numeral 1, is used by way of example for an installation for immersion treating vehicle bodies. As a main component, it has an immersion tank 2 which is filled to a certain level with paint in the operational state. With the aid of a transport system 4, the vehicle bodies 3 to be painted are guided through the installation 1 from left to right in FIG. 1. It is interrupted by two stationary rotary stations 5, 6, thereby creating an entry portion 4a, an intermediate portion 4b and an exit portion 4c of the transport system 4 in the region of the immersion tank 2.

Figure 2:
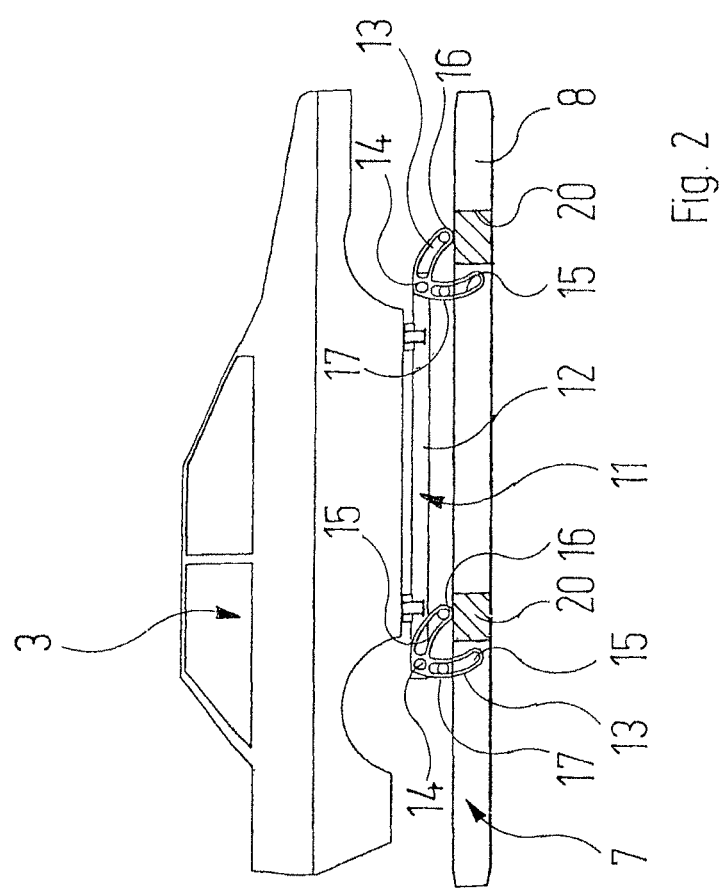
FIG. 2 a side view on an enlarged scale of a vehicle body fastened to a skid, as is used in the installation of FIG. 1, and more precisely in a first, non-immersed rotary position.
Figure 3:
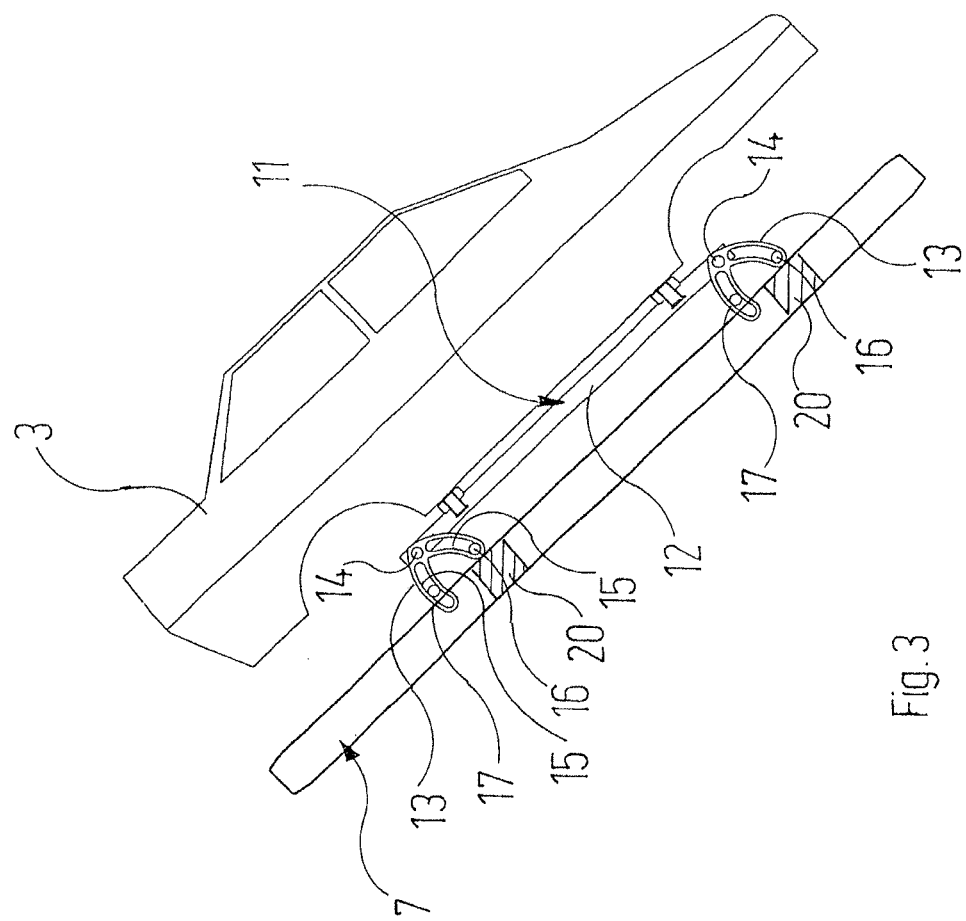
FIG. 3 a side view, similar to FIG. 2, but in which the vehicle body with the skid is located in an intermediate position.

The vehicle bodies 3 are guided through the entire installation on the transport system 4 with the aid of support racks 7, so-called skids, as shown schematically in FIGS. 2 and 3. Such skids are known for transporting vehicle bodies. They are generally notable for having two parallel runners 8 fixed to a base structure 20, of which only the runner 8 which is remote from the observer is visible in FIGS. 2 to 4; the second runner 8, which is parallel thereto, is removed for illustrative purposes. In areas of automotive manufacturing other than the installation 1 described here, the runners 8 cooperate with a known conveyor system, often with roller conveyor systems. So that the skid 7 described here can also be used in these other areas, it likewise possesses runners 8 of this type.

Whilst the vehicle bodies 3 are rigidly fastened to known skids 7, i.e. they cannot move in particular with respect to the runners 8 and the base structure 20 connecting these, the skid 7 shown here has a fastening device 11 which can move with respect to the base structure 20 supporting the runners 8. The fastening device 11 comprises a rectangular frame 12 which forms a holding structure on which the vehicle body 3 can be fastened in known manner using conventional fastening means.

The frame 12 is connected to the base structure 20 of the skid 7 by way of four rockers 13. Two of these rockers 13 are mounted in articulated manner on the trailing end of the frame 12, as seen in the movement direction; two more of these rockers 13 are similarly arranged in articulated manner on the leading region of the frame 12, as seen in the movement direction. In FIGS. 2 and 3, only that rocker 13 of each pair which is remote from the observer is shown; the second rocker 13 of the pairs in each case is again removed for illustrative purposes.

The rockers 13 are roughly in the shape of a horseshoe or U, with the two limbs of the horseshoe or U adjoining one another at an angle in the centre. In the region of the centre of the rockers 13, in the vertex, they are penetrated by a pivot pin 14 which is used to mount them in articulated manner on the frame 12.

A respective curved slot 15 is constructed in both limbs of the rockers 13. A guide pin 16 or 17, which is fastened to the base structure 20 or to a runner 8 of the skid 7, engages in each of the two slots 15.

The precise construction of the two rotary stations 5, 6 is of minor significance in the present connection. It suffices to know that they have a rotary platform 16 provided with suitable guides for the skids 7. For example, guide rollers, which can be moved in guide rails of the rotary platform 16, can be arranged on the outer sides of the runners 8 of the skids.

The two rotary platforms 16 can be set in rotation with the aid of geared motors (not illustrated).

The portions 4a, 4b and 4c of the transport system 4 are constructed as conventional roller conveyors. The movement of the vehicle bodies 3 onto the rotary platforms 16 and away from these are effected with the aid of a slide mechanism (not illustrated in detail) which acts on the skid 7 with chain-driven drivers.

The mode of operation of the installation 1 described above is as follows:

The vehicle bodies 3 to be painted are supplied from the left in FIG. 1 with the aid of the entry portion 4a of the transport system 4. During this, they are mounted on the fastening device 11, and more precisely on the frame 12. The rockers 13 are located in the position shown in FIG. 2, in which the "tip" of the horseshoe or U points upwards to the left. In this position of the rockers 13, the one guide pin 16 is located in the upper region of the slot 15 in the left limb of the rocker 13, whilst the second guide pin 16 is located in the lower region of the slot 15 in the right limb of the rocker 13.

The vehicle body 3 is in a stable position here, since it is secured against a further gravity-induced pivotal movement in an anti-clockwise direction in FIG. 2 as a result of the mechanical stop between the guide pins 16 and 17 and the slots 15. The weight of the vehicle body 3 and the frame 12 acts against a pivotal movement of the rockers 13 in the clockwise direction since this requires these parts to be firstly raised somewhat.

In the non-immersed position in FIG. 2, the vehicle body 3 is at a relatively small spacing from the skid 7 so that the vehicle bodies 3 are conveyed a short distance above the transport system 4.

When the vehicle bodies 3 arrive in the region of the first rotary station 5, the slide system (which is mentioned above but not shown) takes over the further transportation of the skid 7 carrying the vehicle body 3 and feeds this onto the rotary platform 16 of this rotary station 5. During this, the runners 8 of the skid 7 are guided on the rotary platform 16 in the manner already indicated above. The skid 7 which has been fed onto the rotary platform 16 is locked thereon in suitable manner.

Figure 4:
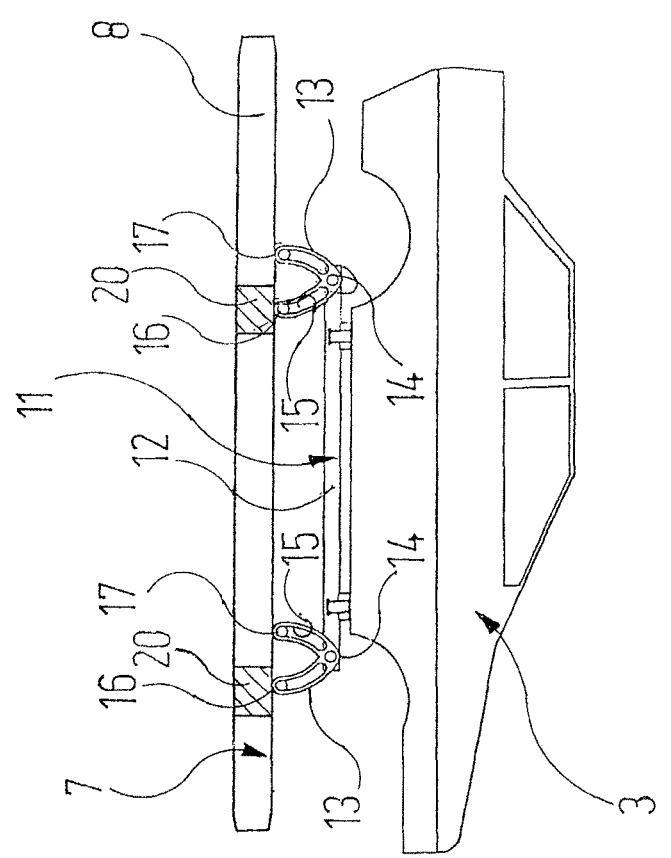
FIG. 4 a side view, similar to FIGS. 2 and 3, but in which the vehicle body with the skid is located in an immersed position.

The geared motors are now supplied with current so that the rotary platform 16 of the rotary station 5 starts to rotate, more precisely in the clockwise direction. During this, it passes through an angle of 180°. In the course of this movement, there is a moment in which the pivot pins 14 are practically vertically above the guide pins 16. This situation is shown in FIG. 3. During the rotation of the rotary platform 16 and the skid 7, the vehicle body 3 with the frame 12 pivots the rockers 13. During this, the guide pins 16, 17 slide in the corresponding slots 15 of the limbs of the rockers 13. After the rotary platform 16, and therefore the vehicle body 3, has rotated through 180°, the position shown in FIG. 4 is achieved, in which the vertices of the rockers 13 point downwards. The guide pins 17 have now reached that end of the associated slot 15 which is opposite its starting position.

In the position shown in FIG. 4, the frame 12 of the fastening device 11 with the vehicle body 3 fastened thereto now reaches the maximum spacing from the base structure 20 of the skid 7. By comparing FIG. 2, in which the angle of rotation is 0°, with FIG. 4, in which the angle of rotation is 180°, it is possible to see that the non-immersed vehicle body 3 (0°) is at a very much smaller spacing in the vertical direction from the skid 7 and therefore also from the rotary platform 16 than it is in the fully immersed state (180°).

It is possible for the vehicle body 3 to remain in the immersed position (angle of rotation 180°) for a certain time as desired. Sooner or later, the vehicle body and the skid 7 carrying it are fed in a suspended position onto the intermediate portion 4b of the transport system 4 with the aid of a similar slide mechanism. They are now moved further there in conventional manner, during which they are moved through the paint located in the immersion tank 2. Owing to the viscosity of this paint, the rockers 13 can then be somewhat at an angle.

Once the vehicle body 3 has passed through the intermediate portion 4b of the transport system 4 in this suspended position, it is again fed onto the rotary platform 16 of the second rotary station 6 with the aid of a slide mechanism. The rotary platform 16 of the second rotary station is now set in rotation with the aid of the associated geared motors, and, more precisely, preferably in the same direction as the rotation in the first rotary station 5, i.e. in a clockwise direction. However, it would also essentially be conceivable for the rotational movement during the removal of the vehicle body 3 to be in the opposite direction of rotation to that of the immersion.

Once the vehicle body 3 has then reached its non-immersed, substantially horizontal position on the rotary platform 16 of the second rotary station 6, it can be fed onto the exit portion 4c of the transport system 4 with the aid of a further slide mechanism (not shown) and transported there in conventional manner.

Various other processing stations, which likewise have immersion tanks filled with particular treatment fluids and through which the vehicle bodies 3 are guided in the same manner as described above for the cataphoretic immersion bath, can be connected upstream and downstream of the described section of an immersion painting installation 1.

It is to be understood that additional embodiments of the present invention described herein may be contemplated by one of ordinary skill in the art and that the scope of the present invention is not limited to the embodiments disclosed. While specific embodiments of the present invention have been illustrated and described, numerous modifications come to mind without significantly departing from the spirit of the invention, and the scope of protection is only limited by the scope of the accompanying claims.

The invention claimed is:

1. An installation for immersion treating objects comprising:
   a) at least one immersion tank, which can be filled to a certain level with a treatment fluid;
   b) a transport system, which moves objects towards the at least one immersion tank and away from the at least one immersion tank;
   c) at least one stationary rotary station, which is provided on the at least one immersion tank and has a rotary platform on which at least one object can be fastened in each case and which can be rotated from a first position, in which the object is located above the level of the treatment fluid, into a second position, in which the objects located below the level of the treatment fluid, and/or in the opposite direction between these two positions;
wherein
   d) each object can be fastened to a skid, which cooperates with the transport system and can be fixed on the rotary platform of the at least one stationary rotary station, wherein the skid has a base structure and a fastening device for the object;
wherein
   e) the fastening device has a holding structure for the object and at least two rockers, which are in the shape of a U or a V and are fastened in pivotable manner to the holding structure at their vertex;
wherein
   f) both limbs of the U or V shaped rockers have a slot in which a guide pin which is fastened to the skid engages in each case and slides in the corresponding slot upon a rotation of the skid.

2. An installation according to claim 1, wherein the fastening device has a damping device which brakes the gravity-induced movement of the object with respect to the skid.

* * * * *